(12) United States Patent
Sharma et al.

(10) Patent No.: US 9,715,513 B2
(45) Date of Patent: Jul. 25, 2017

(54) SYSTEM, METHOD AND COMPUTING APPARATUS TO ISOLATE A DATABASE IN A DATABASE SYSTEM

(71) Applicant: CELLOS SOFTWARE LTD, Melbourne (AU)

(72) Inventors: Chandresh Sharma, Dholpur (IN); Prafulla Kumar, Patna (IN)

(73) Assignee: CELLOS SOFTWARE LIMITED, Melbourne (AU)

( * ) Notice: Subject to any disclaimer, the term of this patent is extended or adjusted under 35 U.S.C. 154(b) by 425 days.

(21) Appl. No.: 14/624,189

(22) Filed: Feb. 17, 2015

(65) Prior Publication Data
US 2015/0234867 A1  Aug. 20, 2015

Related U.S. Application Data

(60) Provisional application No. 61/941,695, filed on Feb. 19, 2014.

(51) Int. Cl.
*G06F 17/30* (2006.01)

(52) U.S. Cl.
CPC .. *G06F 17/30289* (2013.01); *G06F 17/30339* (2013.01); *G06F 17/30584* (2013.01)

(58) Field of Classification Search
USPC ........................................ 707/792, 802–803
See application file for complete search history.

(56) References Cited

U.S. PATENT DOCUMENTS

| | | | | |
|---|---|---|---|---|
| 6,466,941 B1* | 10/2002 | Rowe | ................... | G06F 17/3089 707/786 |
| 6,865,737 B1* | 3/2005 | Lucas | ....................... | G06F 8/61 717/178 |
| 7,089,255 B1* | 8/2006 | Turba | ................. | G06F 17/30893 |
| 7,451,103 B1* | 11/2008 | Boyle | .................... | G06Q 20/10 705/35 |
| 2002/0103737 A1* | 8/2002 | Briere | .................... | G06Q 30/02 705/36 R |
| 2003/0058277 A1* | 3/2003 | Bowman-Amuah | ............. | G06F 17/30607 715/765 |
| 2003/0229524 A1* | 12/2003 | Reuveni | .............. | G06F 11/3409 705/7.11 |
| 2005/0256852 A1* | 11/2005 | McNall | ............. | G06F 17/30398 |

(Continued)

*Primary Examiner* — Hanh Thai
(74) *Attorney, Agent, or Firm* — Shumaker, Loop & Kendrick, LLP

(57) ABSTRACT

The present invention relates to a system, method and computing apparatus to isolate a database in a database system. The disclosure of the present invention enables more efficient and more secured implementation of "database isolation" in a multi-tenant or multi-user database system storing service data belonging to different users. The user identifier(s) are extracted from the default database, creating a user table according to the extracted user identifier(s), creating a service table in the main database with owner user identifier column and owner group identifier column inserted, it can efficiently create view to a user when the user requests to access the service data which the user owns or the user is authorized to access. The created service table with owner user identifier column and owner group identifier column inserted achieve database isolation at database level, and the created view achieves database isolation at application level.

19 Claims, 11 Drawing Sheets

(56) References Cited

U.S. PATENT DOCUMENTS

| | | | |
|---|---|---|---|
| 2007/0047705 A1* | 3/2007 | Eskelinen | H04M 15/00 379/114.03 |
| 2007/0112834 A1* | 5/2007 | Farr | G06F 17/303 |
| 2008/0095339 A1* | 4/2008 | Elliott | H04L 12/14 379/93.01 |
| 2011/0231930 A1 | 9/2011 | Howarth | |
| 2012/0036165 A1 | 2/2012 | Driesen et al. | |
| 2012/0110020 A1 | 5/2012 | Weissman et al. | |
| 2012/0185821 A1* | 7/2012 | Yaseen | G06F 8/10 717/105 |
| 2012/0191698 A1* | 7/2012 | Albrecht | G06F 17/30442 707/718 |
| 2012/0209884 A1 | 8/2012 | Mattsson et al. | |
| 2012/0271437 A1* | 10/2012 | Senart | G06Q 10/06 700/29 |
| 2013/0132472 A1* | 5/2013 | Sundarrajan | H04L 67/42 709/203 |
| 2013/0250965 A1* | 9/2013 | Yakan | H04L 45/021 370/401 |
| 2013/0325907 A1* | 12/2013 | Montes de Oca | G06F 17/30914 707/811 |
| 2014/0075565 A1* | 3/2014 | Srinivasan | G06Q 10/06315 726/26 |
| 2014/0122827 A1* | 5/2014 | Kumar | G06F 17/30345 711/206 |

\* cited by examiner

SYSTEM, METHOD AND COMPUTING APPARATUS TO ISOLATE A DATABASE IN A DATABASE SYSTEM

CROSS-REFERENCE TO RELATED APPLICATION

This application claims the benefit of priority under 35 U.S.C. §119(e) to U.S. Provisional Patent Application Ser. No. 61/941,695 filed on Feb. 19, 2014.

TECHNICAL FIELD

The present invention relates to isolation of a database in a database system, and more particularly it relates to a system, a method and a computing apparatus to isolate a database in a database system.

BACKGROUND

The advent of cloud-based computing architectures has opened new possibilities for the rapid and scalable deployment of virtual Web stores, media outlets, and other on-line sites or services. Generally speaking, cloud computing involves delivery of computing as a service rather than a product, whereby shared resources (software, storage resources, etc.) are provided to computing devices as a service. The resources are shared over a network, which is typically the internet. In a cloud computing system, there is a plurality of physical computing machines generally known as nodes. These nodes are connected with each other, either via a high speed local area network or via a high speed bus connection to form a cloud computing infrastructure. The operator of the cloud computing infrastructure provides services to many users such as user computing devices connected to the cloud computing infrastructure via internet. A user or customer can request the instantiation of a node or set of nodes from those resources from a central server or management system to perform intended services or applications. Usually, each service includes several processes running on different nodes and each node may have multi-core processors for simultaneously running multiple processes.

The computing cloud infrastructure 10 provides a Virtualized Cloud Platform (VCP) environment to run user binaries. Hardware resource like processors, memory and database will be shared across different users. However, one user should not be allowed to access to the network resources of the other users. In particular, one user should be allowed to only access service data of the user but not allowed to access service data of any other user. As such, it requires database isolation mechanism that allows a user A access to only service information belonging to the user A, and in the meantime hiding the information of other users from the user A.

In this context, there is a need for solutions to isolate the data both at the application level and the database level.

SUMMARY OF THE INVENTION

The object of the present invention is to provide a system, method and computing apparatus to isolate a database in a database system.

According to first aspect of the invention, there is provided a system to isolate a database in a database system. The system comprises: a computing apparatus, configured to perform the following upon receipt of input commands from an operating user. Fetching, a user identifier and a set of user parameters of each current user in the database system from a default user table; and fetching, a group identifier of each current user from a group table in a main database. Creating, a user table for storing all the fetched user identifiers, all the fetched group identifiers and the user parameters of the current users; then, fetching, the user identifier and the group identifier from the user table corresponding to a user name input by the operating user upon login in to the system; thereafter, creating, a plurality of service tables respectively from a plurality of predetermined tables stored in an application database in the main database; inserting, into each of the created service tables, a user column which stores owner user identifiers corresponding to each of the stored user identifiers and a group column which stores owner group identifier corresponding to each of the stored group identifiers; determining, the operating user at run time and fetching at least one row corresponding to the operating user from each of the created service tables according to the owner user identifier and the owner group identifier of the operating user; creating, a view for each of the created service tables based on the fetched at least one row of the operating user and one of the input commands; and finally, presenting to the operating user, the created views containing service data originally stored in the tables of the application database.

In one embodiment of the invention, the default user table and the main database are stored in the database system.

In another embodiment of the invention, the computing apparatus is connected to at least one application node in a cloud computing infrastructure, and the at least one application node reports service data to the computing apparatus.

In one aspect of the invention, the application database comprises the predetermined tables containing service data reported by processes running on the at least one application node in the cloud computing infrastructure.

In another aspect of the invention, the computing apparatus is further configured to store, update and maintain the configuration information of all the processes and services running on the at least one application node in the cloud computing infrastructure.

In further embodiment of the invention, one of the input commands from the operating user is a select query command.

In one embodiment of the invention, the set of user parameters comprise at least user name, user login name and user password of the current users in the database system.

In another embodiment of the invention, the computing apparatus is further configured to maintain, in the default user table, information of all the current users in the database system.

In another embodiment of the invention, the computing apparatus is further configured to update the created service tables according to new service data reported by the at least one application node.

According to one aspect of the invention, there is provided a method to isolate a database in a database system. The method comprises: fetching, a user identifier and a set of user parameters of each current user in the database system from a default user table; fetching, a group identifier of each current user from a group table in a main database; creating, a user table for storing all the fetched user identifiers, all the fetched group identifiers and the set of user parameters of the current users; receiving, a user name and a user password from an operating user, when the operating user logs into the system; thereafter, fetching one of the stored user identifiers and one of the stored group identifiers corresponding to the user name input by the operating user; then creating, a plurality of service tables respectively from a plurality of predetermined tables stored in an application database in the main database; inserting, into each of the created service tables, a user column which stores owner user identifiers corresponding to each of the stored user identifiers and a group column which stores owner group identifier corresponding to each of the stored group identifiers; determining, the operating user at run time and fetching at least one row corresponding to the operating user from each of the created service tables according to the owner user identifier and the owner group identifier of the operating user; creating, a view for each of the created service tables based on the fetched at least one row of the operating user and one of input commands from the operating user and finally, presenting, to the operating user, the created views containing service data originally stored in the tables of the application database.

In another aspect of the invention, the default user table and the main database are stored in the database system.

In further aspect of the invention, the database system is stored in a computing apparatus.

In another embodiment of the invention, the method further comprises: receiving service data reported by the at least one application node connected with the computing apparatus.

In further embodiment of the invention, one of the input commands from the operating user is a select query command.

In one aspect of the invention, the method further comprises: updating the created service tables according to new service data reported by the at least one application node.

According to further aspect of the invention, there is provided a computing apparatus to isolate a database system. The computing apparatus comprises: a management process module configured to perform the following. Fetching, a user identifier and a set of user parameters of each current user in the database system from a default user table; fetching a group identifier of each current user from a group table in a main database; creating, a user table for storing all the fetched user identifiers, all the fetched group identifiers and the related user parameters of the current users; fetching one of the stored user identifiers and one of the stored group identifiers corresponding to a user name input by an operating user; creating, a plurality of service tables respectively from a plurality of predetermined tables stored in an application database in the main database; inserting, into each of the created service tables, a user column which stores owner user identifiers corresponding to each of the stored user identifiers and a group column which stores owner group identifier corresponding to each of the stored group identifiers; determining, the operating user at run time and fetching at least one row corresponding to the operating user from each of the created service tables according to the owner user identifier and the owner group identifier of the operating use; creating, a view for each of the created service tables based on the fetched at least one row of the operating user and one of the input commands; and finally, displaying, to the operating user, the created views containing service data originally stored in the predetermined tables of the application database.

In yet another embodiment of the invention, the computing apparatus further comprises: a network interface, connected with at least one application node, and configured for receiving service data from the at least one application node.

In another aspect of the invention, the default user table and the main database are stored in the database system, and the database system is stored in the computing apparatus.

In yet another embodiment of the invention, the management process module is configured to display the created view in the main database to the operating user via an external displaying device.

BRIEF DESCRIPTION OF DRAWINGS

Other features, objects and advantages of the present invention will be apparent by reading the following detailed description of non-limiting exemplary embodiments with reference to appended drawings.

DETAILED DESCRIPTIONS OF EXEMPLARY EMBODIMENTS

In order to address the problems or challenges of isolating a database in a database system, the present invention proposes a method, a computing apparatus and a system to isolate the database.

Figure 1:
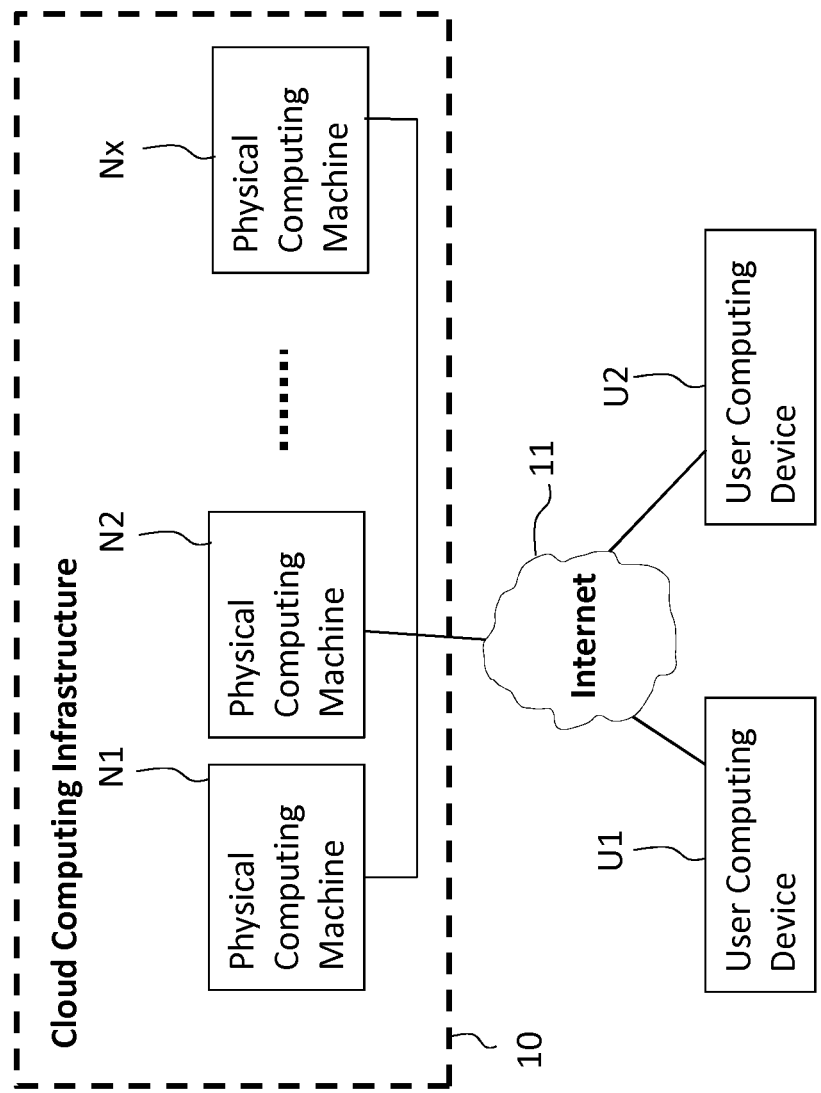
FIG. 1 illustrates a conventional cloud computing system.

FIG. 1 illustrates a conventional computing cloud system. In a computing cloud system there are a plurality of physical computing machines N1, N2, . . . , Nx logically connected to each other and referred as nodes N1, N2, Nx in the present disclosure. These nodes N1, N2, Nx are connected with each other either via high speed local area network or via high speed bus connections to form a cloud computing infrastructure 10. The operator of the cloud computing infrastructure 10 provides services to many users such as user computing devices U1, U2 connected to the cloud computing infrastructure 10 via internet 11. Generally, each service may include plurality of processes running in any of the nodes N1, N2, Nx, and each node may have multi core processors for running multiple processes simultaneously.

Figure 2:
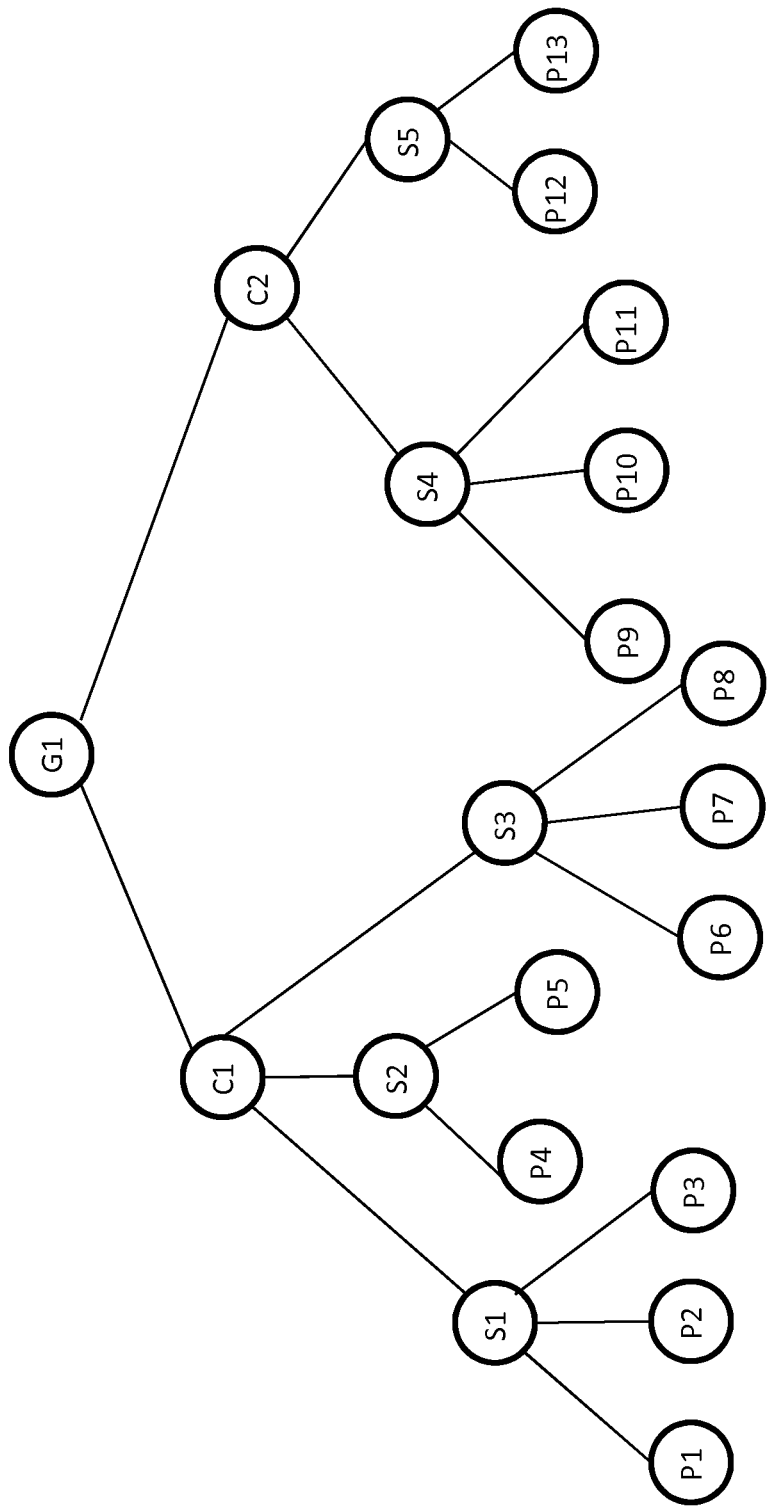
FIG. 2 is a schematic diagram illustrating an exemplary logical structure of the services and their respective processes running on multiple nodes in the computing cloud infrastructure.

FIG. 2 illustrates exemplary logical structure of the services and their respective processes running on multiple nodes in the cloud computing infrastructure 10. In a cloud computing infrastructure there is provided a logical node G1, which represents a group of services that is to be provided to a particular user or a particular set of users. The said node G1, is comprised of multiple clusters of services C1, C2, . . . , Cn. Further, under cluster C1 there are multiple service objects S1, S2, S3 and similarly, under the cluster C2, there are multiple service objects S4, S5. Further down the hierarchal structure there are provided set of processes P1, P2 and P3 under the service S1 to enable the basic computational functions of the service S1. Similarly, processes P4 and P5 functions for the service S2; processes P6, P7, P8 under the service S3; processes P9, P10, P11 under the service S4; and processes P12, P13 under the service S5.

In practice, the cloud computing infrastructure 10 includes several groups respectively including several clusters; under each cluster, there are several services; and there are a large number of processes running simultaneously for each service resulting in complicated structure of the cloud computing infrastructure 10. Referring to FIG. 2, due to system scalability and load balancing of the cloud computing infrastructure 10, its operator may determine to distribute processes of each services across the nodes N1, N2, . . . , Nx. The example shown in FIG. 2 starts from the logical node G1, which may represent a group of business functions that may be provided to a particular user or a particular set of users. Here, for instance, the user may refer to the one using the user computing device U1.

Under G1, there may be multiple clusters of services and the clusters being represented by C1, C2. Under the cluster C1, there may be multiple service objects further down the hierarchical structure such as services S1, S2, S3. Similarly, under the cluster C2, there may be multiple service objects further down the hierarchical structure such as services S4, S5.

Figure 3:
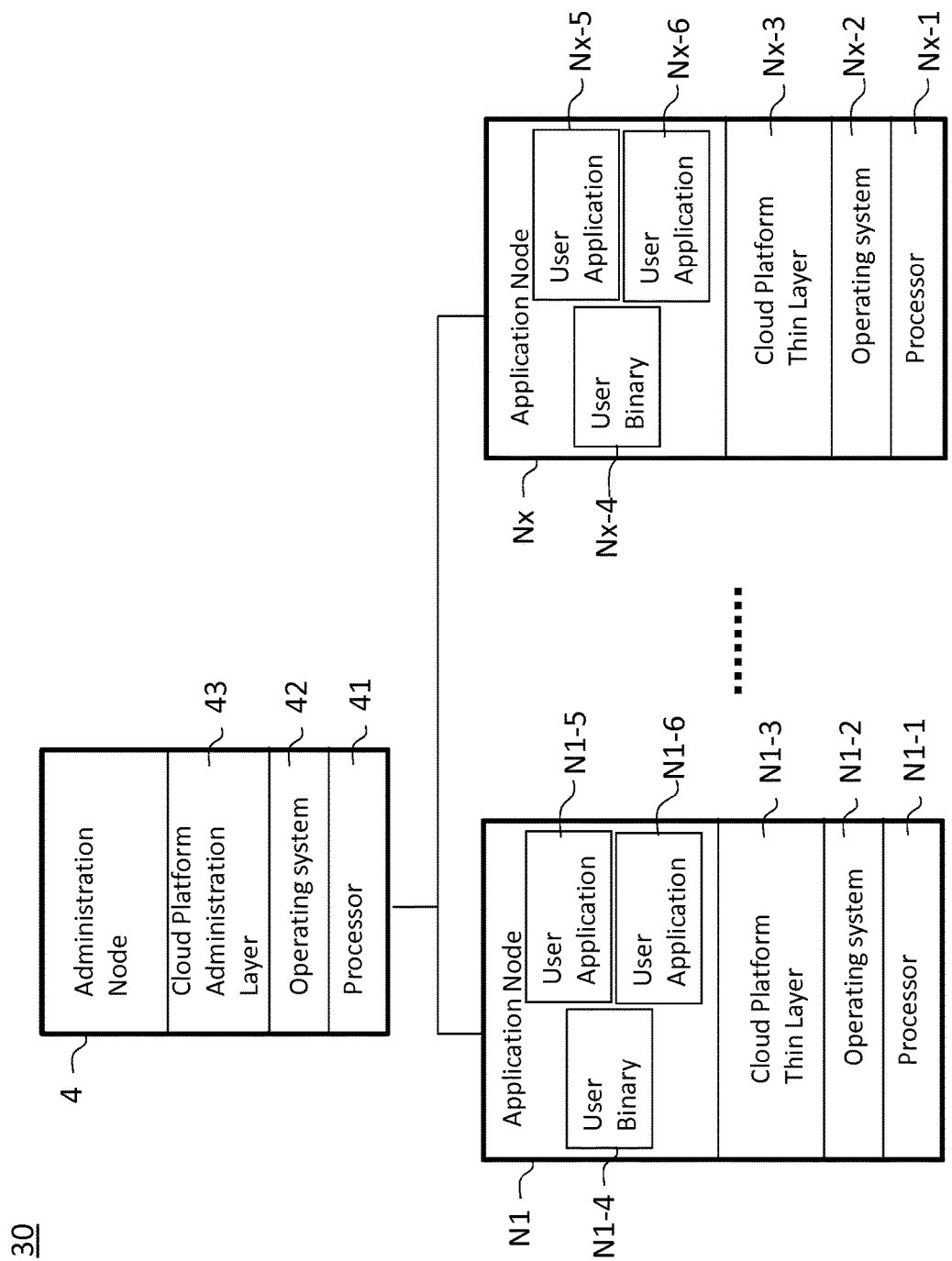
FIG. 3 is a schematic diagram illustrating a system of computing cloud infrastructure according to an exemplary embodiment.

FIG. 3 illustrates a cloud computing infrastructure 30 according to the present invention. The cloud computing infrastructure 30 includes at least one administration node 4 and a plurality of application nodes (N1, . . . , Nx). The plurality of application nodes (N1, . . . , Nx) and the administration node 4 are connected with each other logically via local area network, via Internet or via high speed bus links. In order to balance the load of the administration node, there can be more than one administration node 4 configured to be operative in the cloud computing infrastructure 30.

Figure 4:
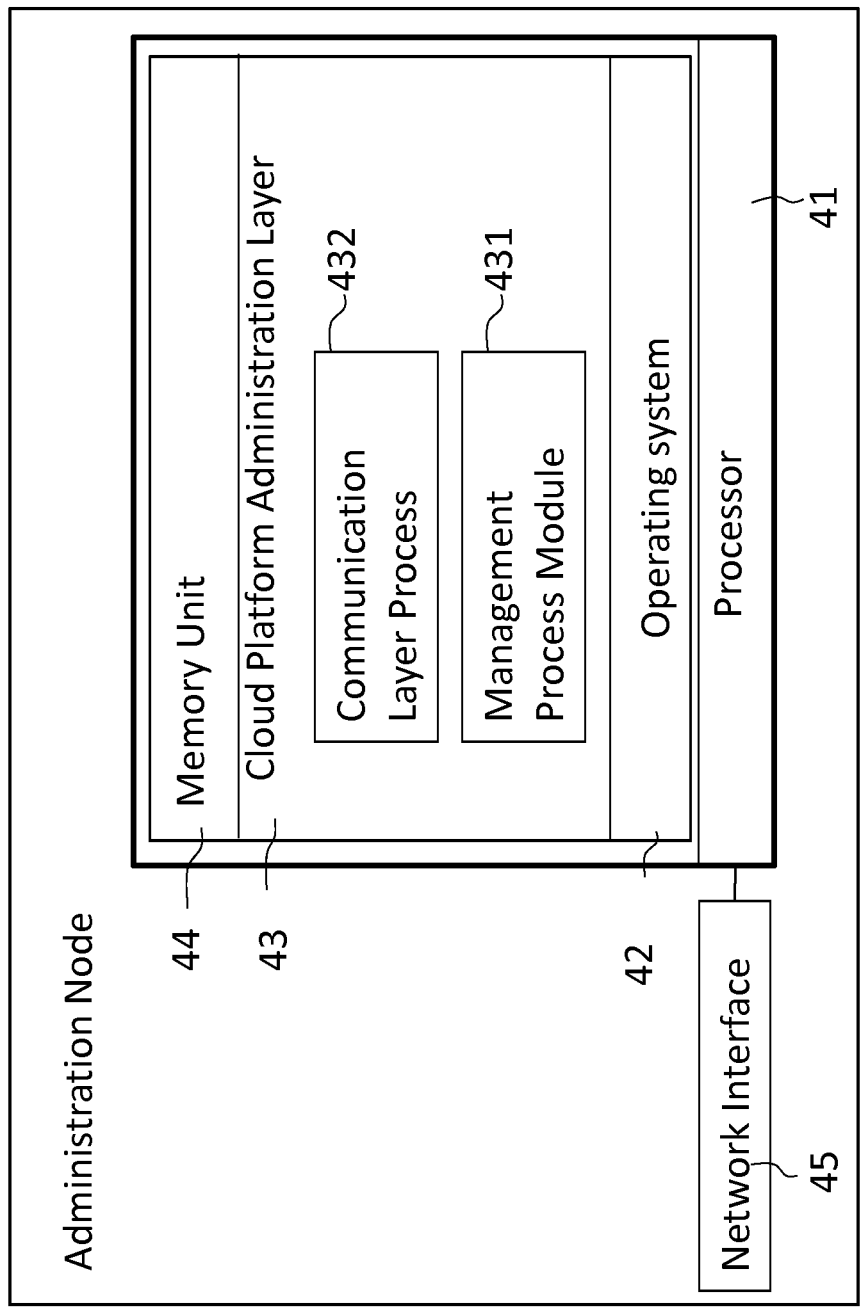
FIG. 4 is schematic diagram illustrating functional elements of an administration node according to an exemplary embodiment.

FIG. 4 illustrates the functional elements of the administration node 4 according to an exemplary embodiment of the present invention. Referring to FIG. 4, the administration node 4 includes a processor 41, a memory unit 44. Further, there is provided an operating system 42 running on the processor 41 in the memory unit 44. A cloud platform administration layer 43 is also provided, which runs on top of the operating system 42. The cloud platform administration layer 43 includes a communication layer process (CLP) entity 432, which is configured to enable communication of the administration node with other application nodes (N1, . . . , Nx) and other administration node 4 (if any) in the cloud computing infrastructure 30. Further, the cloud platform administration layer 43 is also configured to adapt at least a management process module 431 to manage or monitor other application nodes (N1, . . . , Nx) in the cloud computing infrastructure 30. Additionally, the administration node 4 also includes a network interface 45 communicatively connected to the CLP 432.

The management process module 431 is provided with a configuration database for storing, updating and maintaining all configuration information of each process in each service and configuration information of each service in the cloud computing infrastructure 30. The said configuration database can be in form of software instances or software entities respectively responsible for managing clusters of processes, logging events, raising alarms, monitoring essential process of each application node, storing and updating static configuration of each application node in the cloud computing infrastructure 30. For example, the management process module 431 may include an operation-administration-monitoring process (OAMP) entity 71 (shown in FIG. 7) responsible for storing, updating and maintaining all configuration information of each process in each service and configuration information of each service in the cloud computing infrastructure 30. Also, the management process module 431 includes other software entities respectively responsible for receiving input commands from users regarding storing, managing and updating configurations of "Groups", configurations of "Clusters" under each "Group", configurations of "Services" under each "Cluster"; and finally configurations of "Processes" under each "Service". The CLP entity 432 is configured to provide communication functionalities for other processes in the administration node 4 to communicate with application nodes (N1, . . . , Nx). For instance, the CLP entity 432 includes routing tables related to application nodes (N1, . . . , Nx), forward domain name resolution mapping tables of application nodes (N1, . . . , Nx), and networking protocol stack software.

Figure 5:
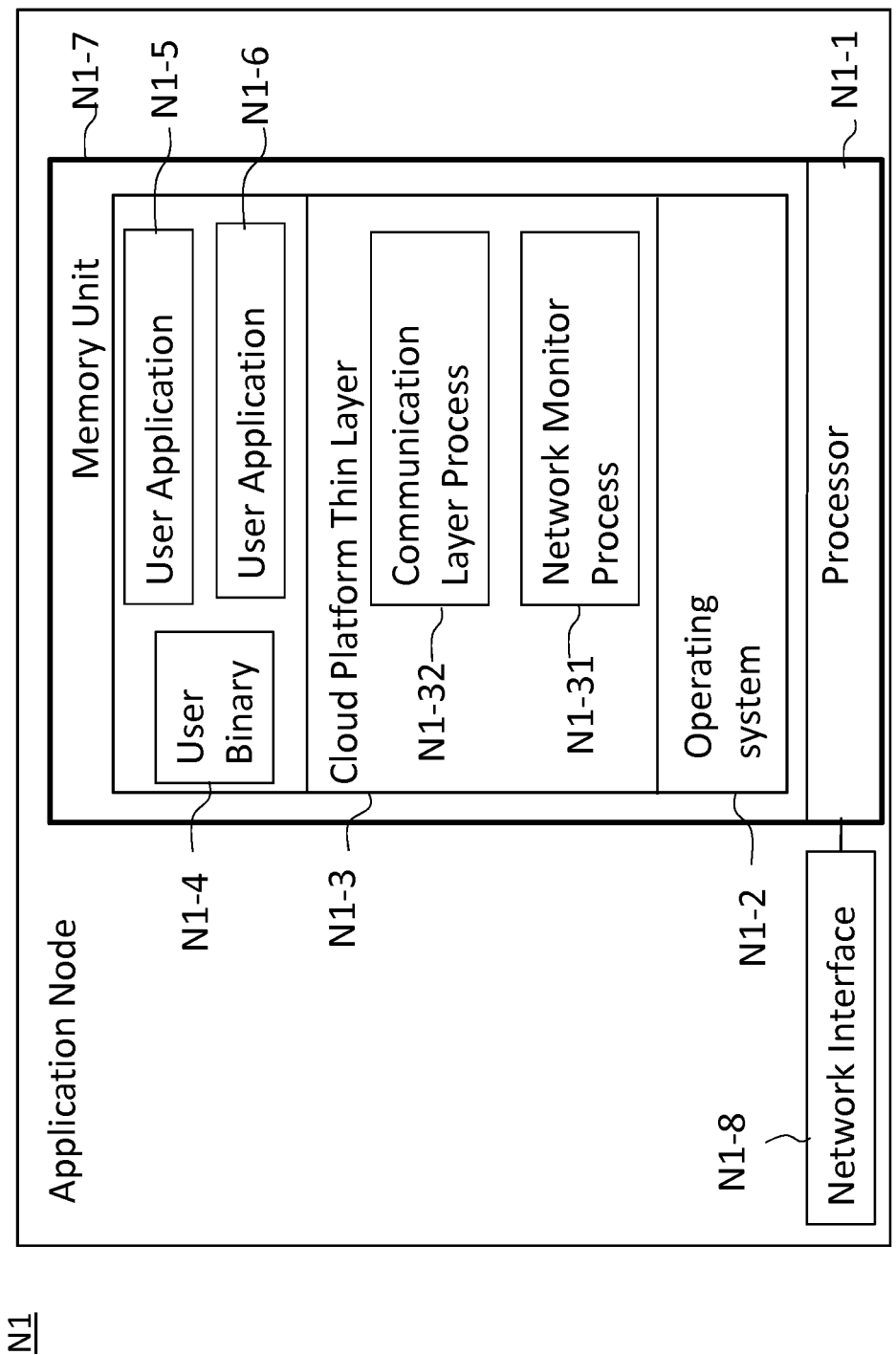
FIG. 5 is a schematic diagram illustrating functional elements of an application node according to an exemplary embodiment.

FIG. 5 is a schematic diagram illustrating functional elements of the application node N1 according to an exemplary embodiment of the present invention. Referring to FIG. 5, the application node N1 is configured to adapt a processor N1-1, an operating system N1-2 running on the processor N1-1 in a memory unit N1-7, and a cloud platform thin layer N1-3 running on top of the operating system N1-2. Also, there is provided a user binary N1-4 or user applications (N1-5, N1-6) running on top of the cloud platform thin layer N1-3. In the present disclosure, the user binary or the user application running in an application node is the process of a service in the cloud computing infrastructure 30. The other application nodes have similar functional elements as disclosed above in respect of the application node N1.

Further, the cloud platform thin layer N1-3 includes a network monitoring process (NMP) entity N1-31 responsible for monitoring and managing processes and a communication layer process (CLP) entity N1-32 responsible for communications with other application nodes and administration node in the cloud computing infrastructure 30. The NMP entity N1-31 includes software instance or software entities respectively responsible for managing and monitoring processes running on top of the cloud platform thin layer N1-3. The user binary N1-4 may be software provided by the third party software provider; and the user application is software which can be configured in each application node. Additionally, the application node N1 includes a network interface N1-8 communicatively connected to the CLP entity N1-32.

The CLP entity N1-32 is configured to provide communication functionalities for other processes in the application node N1 to communicate with administration node 4 and other application nodes (N1, . . . , Nx). For instance, the CLP entity N1-32 may include routing tables related to the administration node 4 and the application nodes (N1, . . . , Nx), forward domain name resolution mapping tables associated to the administration node 4 and the application nodes (N2, . . . , Nx), and networking protocol stack software. The management process module 431 of the administration node 4 monitors the NMP entity N1-31 in each application node present in the cloud computing infrastructure 30.

Figure 6:
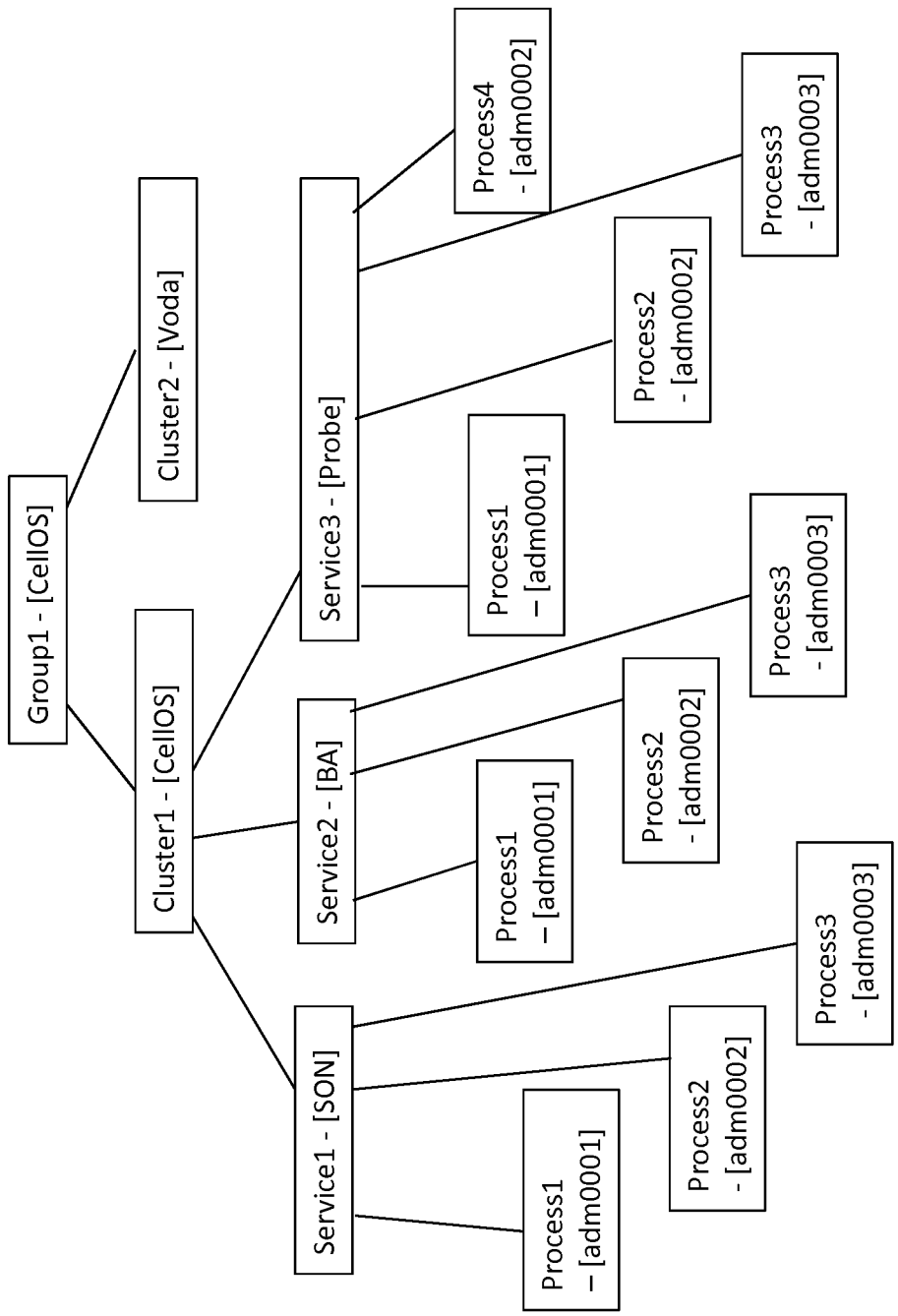
FIG. 6 is a schematic diagram illustrating an exemplary hierarchical structure of processes of services in the computing cloud infrastructure.

FIG. 6 is a schematic diagram illustrating an exemplary hierarchical structure of processes of services in a cloud computing infrastructure. For instance, each cluster under Group 1 (with a group name of "CellOS") belongs to a telecommunication service provider as a user in the cloud computing infrastructure 30. For the simplicity of illustration, there are only two clusters shown in FIG. 6 such as "Cluster 1" (assigned with a cluster name of "CellOS") and "Cluster2" (assigned with a cluster name of "Voda"). Also, the detailed elements in the hierarchical structure of "Cluster 2" are not shown in FIG. 6, but the logical structure of "Cluster2" is similar to that of the "Cluster1".

Referring to FIG. 6, under the "Cluster1" (assigned with the cluster name of "CellOS"), there are currently three services such as "Service1", "Service2", "Service3" which respectively have their service names of "SON", "BA" and "Probe". Here "SON", "BA" and "Probe" represent different business services that the user "CellOS" subscribes to. The second user such as "Voda" may subscribe to different sets of services from those subscribed by the first user "CellOS".

At the instance shown in FIG. 6, there are 3 processes currently belonging to "Service 1" such as "Process1", "Process2", "Process3" which respectively are named with "adm0001", "adm0002" and "adm0003" in the cloud computing infrastructure 30. Similarly, there are 3 processes currently belonging to "Service 2" such as "Process1", "Process2", "Process3" which respectively are named with "adm0001", "adm0002" and "adm0003". Likewise, there are 4 processes belonging to "Service 3" such as "Process1", "Process2", "Process3" and "Process4" which respectively are named with "adm0001", "adm0002", "adm0003" and "adm0004".

It should be noted that not all process objects belonging to the same service object are running in the same application node N1. For example, "Process1", "Process2", "Process3" belonging to "Service2" may be running on different application nodes (N1, Nx). In some cases, the process objects belonging to the same service object may be running on different application nodes (N1, . . . , Nx) at different geographic locations for load balancing. Also, all process objects and even service objects are assigned with Internet addresses and port numbers. Here, every process object is an instance of service to which it belongs.

According to a preferred embodiment of the invention, the "isolation database" concept is implemented in the cloud computing infrastructure disclosed above.

Figure 7:
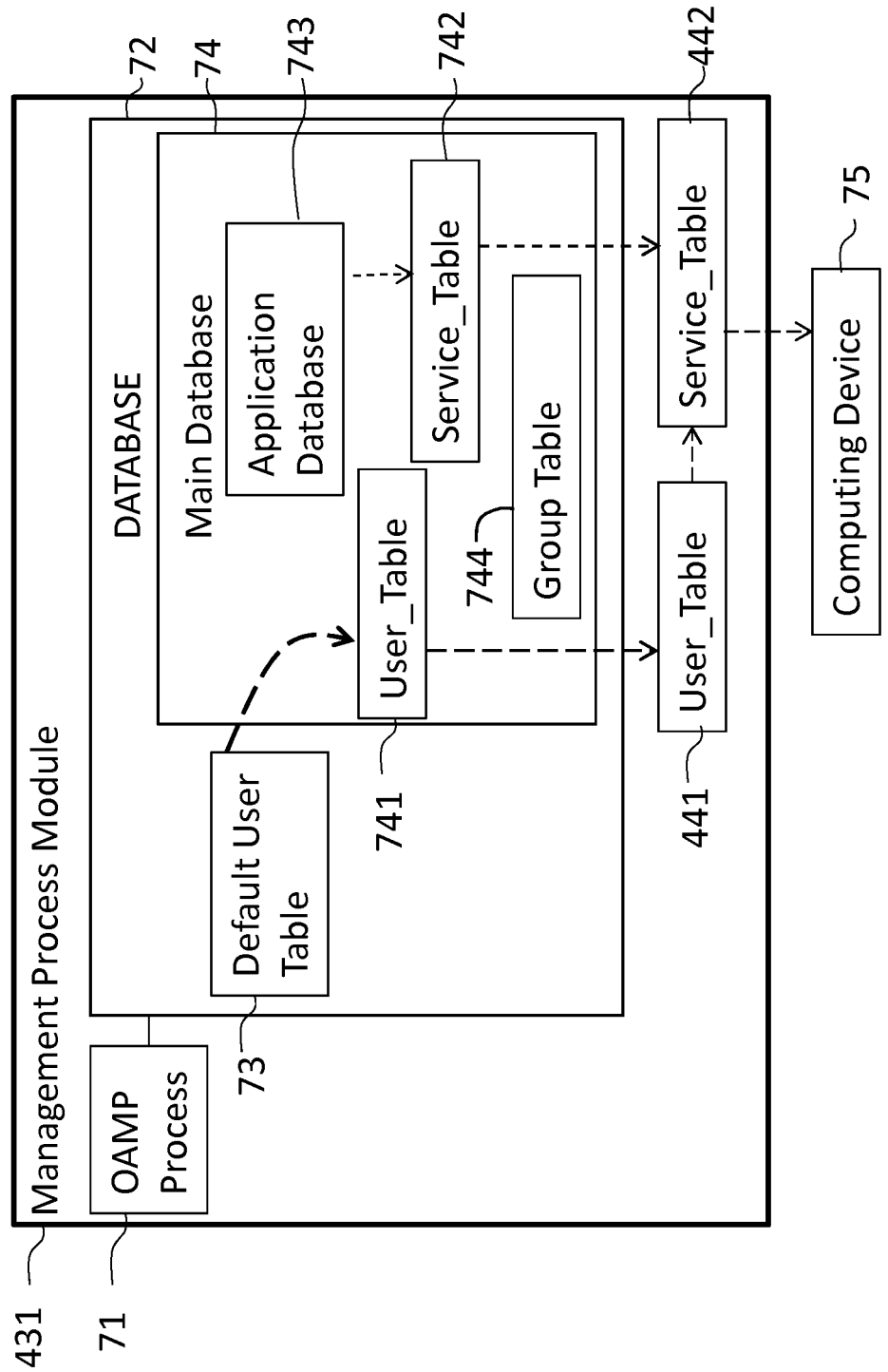
FIG. 7 is a schematic diagram illustrating interaction of the functional elements in the management process module of the administration node according to an exemplary embodiment.

FIG. 7 is a schematic diagram illustrating interaction of the functional elements in the management process module of the administration node 4 according to an exemplary embodiment of the present invention. The functional elements shown in FIG. 7 are configured in the management process module 431 for implementing the "isolation database" concept in a cloud computing infrastructure.

As mentioned previously, the management process module 431 includes an operation-administration-monitoring process (OAMP) entity 71 responsible for storing, updating and maintaining all configuration information of each process in each service and configuration information of each service in the computing cloud infrastructure 30. Also, the management process module 431 includes a database such as a database 72. Further, the database 72 includes a default user table 73 and a main database 74. The default user table 73 is configured to store information of all current users of the main database 74. The database 72 in the management process module 431 is a default database in the computing cloud infrastructure 30. For example, in the database 72, there can be a few default databases which are created at the time of installation of database 72, and are separated from the main database 74.

In the database system of the main database 74, there are two ways used to represent the same information stored in the said database 74. The first way is a table and the second way is view. A user_table 741 is created in the main database 74, which is different from the default user table 73 in the database 72. The user_table 741 is a table configured to store the user information. A "user_table" 441 is a view to represent such user information in the user_table 741. Additionally, the "user_table" view 441 and a "service_table" view 442 is output to a computing device 75 accessed or directly operated by the user. Thereby, the user will see the service data presented on the "service_table" view 442. Here, the output process of data of views are transmitted through Internet to be shown on the computing device 75.

In the management process module 431, the installation process of the administration node 4 may trigger the aforementioned scripts for creating the user table, creating the service table, creating "user_table" view and then creating "service_table" view. However, the scripts may also be executed separately from the instant of installing the administration node 4 in the computing cloud infrastructure 30.

Users other than the root user cannot directly access the default user table 73 and another user table such as the user_table 741 is created in the main database 74 in the present invention. The user_table 741 will be configured to store the user information of the current user in the cloud computing infrastructure 30. Each user is configured as a part of a specific group in the cloud computing infrastructure 30. Here, "group table" 744 is another table created in the main database 74, and the "group table" 744 is configured to store group information of the current user. In the main database 74, there is an application database 743 configured to store information of processes running in the cloud computing infrastructure 30. In the cloud computing infrastructure 30, both the default user table 73 and the application database 743 are only accessible to the root user but not to the other operating user. As such, in the present invention, a set predetermined table in application database 743 will be used to create service_table 742 inside the main database 74 for achieving database level isolation.

In order to present information to users in the cloud computing infrastructure 30, in the present invention, the "service_table" view will be created from the service_table 742. Here, the service_table 742 includes multiple service tables from respective predetermined table in the application database 743. The "service_table" view is configured to represent the data residing in the service_table 742. Both the "service_table" view and the service_table 742 are part of the main database 74. Similarly, the "user_table" view is generated from the user_table 741 in order to provide user information to be inserted in the service_table 742 for presenting the service data stored in the service_table 742 to the operating users. By using the aforementioned database level isolation, generating "service_table" view from the service table(s) and inserting user information in the "service_table" through the "user_table" view created from the user_table 741, the application level isolation may be achieved in the present invention.

In the cloud computing infrastructure 30, the OAMP entity 71 is configured to update service data reported by different processes running on the application nodes N1-Nx and other nodes such as remote nodes connected to the computing cloud infrastructure 30.

Figure 8:
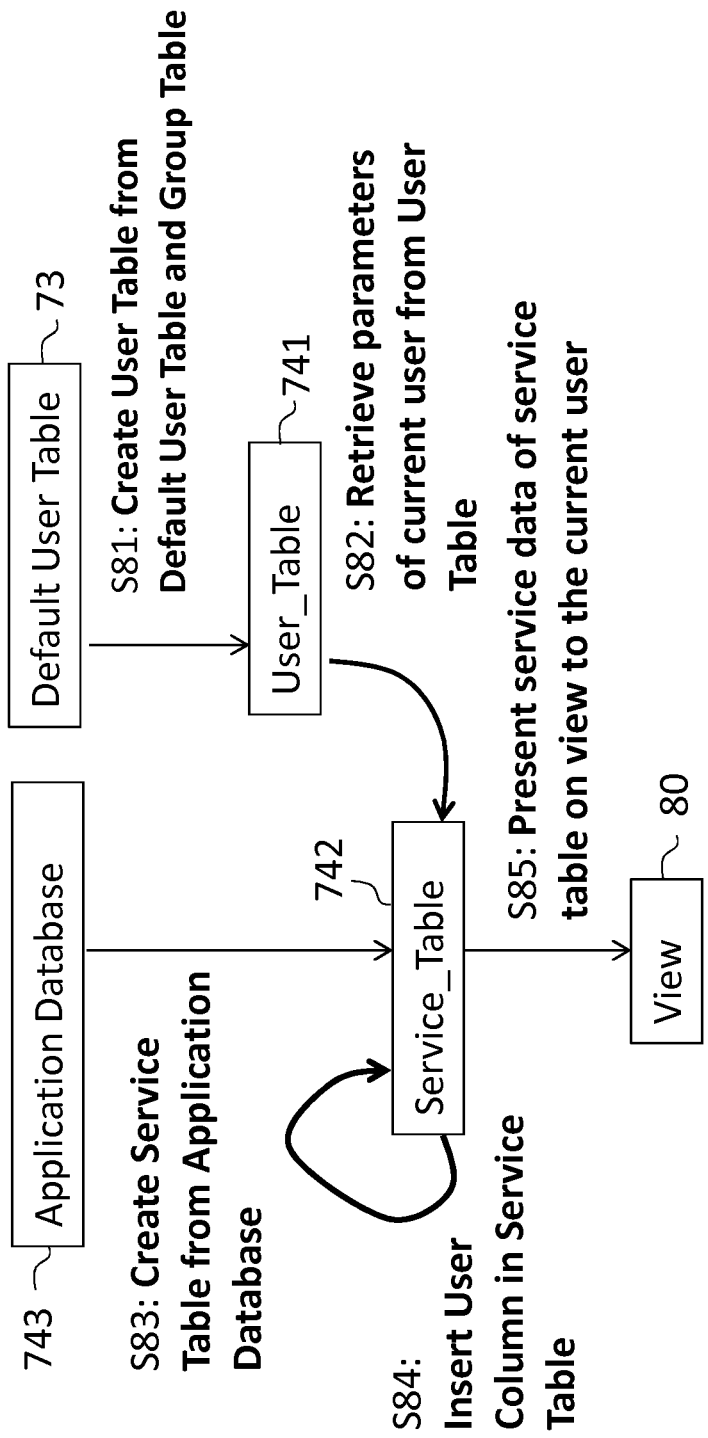
FIG. 8 is a schematic diagram illustrating relationship between functional elements in the process of isolating a database in a database system according to an exemplary embodiment.

FIG. 8 illustrates the relationship between functional elements in the process of isolating a database in a database system according to an exemplary embodiment of the present invention. Steps S81 to S85 is performed by the processor 41 of the administration node 4 according to scripts stored in the memory unit 44. As mentioned previously, the management process module 431 is communicatively connected to the memory unit 44.

Referring to FIG. 8, in the step S81, the user_table 741 is created from the default user table 73 of the database 72. For example, a function "CREATE TABLE USER" may be used to generate the user_table 741 in the main database 74 based on the default user table 73. An exemplary script of the function "CREATE TABLE USER" will be explained in accordance with FIG. 9. The user_table 741 contains at least "user_id" and other user parameters in the default user table 73 and at least "group id" from a group table 744. For example, the parameter of "user_id" and "group_id" for all users stored in the default user table 73 and group table 744 will be stored in the user_table 741. Also, when the user_table 741 is created automatically using "CREATE TABLE USER", the process of creating the user_table 741 requires "user_id" and "group_id" as a primary key and also other parameters such as "user_name", "login_name", "user_password". Here, the "login_name" is the unique key.

In step S82, parameters of current user are retrieved from the user_table 741. The parameters of the current user include "user_name", "login_name" and "user_password". These retrieved parameters are used to insert an owner column in the service_table 742 later on. For example, a function "CURRENTUSER" may be used to return the parameters of the current user of the main database 74. The same function "CURRENTUSER" is used in fetching data from the service tables of the application database 743. The information of all current user such as "user_id" and "group_id" originally are stored in the default user table 73 and group table 744 and only accessible by the root user. By using the function "CURRENTUSER" to fetch data from the user_table 741 created in the step S82, the operating users other than the root user can access parameters belonging to them. An exemplary script of the function "CURRENTUSER" will be explained in accordance with FIG. 9.

In step S83, the service_table 742 is created from the predetermined tables stored in the application database 743. There are various predetermined tables stored in the application database 743. The said service_table 742 is created from theses predetermined tables. For example, a function "CREATE TABLE SERVICES" is used to create the required service_table 742 from the application database 743. An exemplary script of the function "CREATE TABLE SERVICES" will be explained in accordance with FIG. 9.

In step S84, a user column and a group column is inserted in to the created service_table 742. The user column stores the owner user identifiers corresponding to stored user identifiers and the group column stores the owner group identifiers corresponding to stored group identifiers. For example, a script of "CREATE TRIGGER" is used to insert addition column called "owner" into all created tables (in the service_table 742), and this "owner" column will be the key for user to perform "row mapping" in the service_table 742. An exemplary script of the function "CREATE TRIGGER" will be explained in accordance with FIG. 9. Further, the operating user is determined and the row corresponding to the determined operating user is fetched from the created service_table 742.

In step S85, service data of the service_table 742 is presented to the current user by generating a view 80. For example, a function "CREATE VIEW SERVICE_TABLE" may be used to present the view 80 containing requested service data stored in the service_table 742. An exemplary script of the function "CREATE VIEW SERVICE_TABLE" will be explained in accordance with FIG. 9. The view created in step S85 is displayed to the operating user.

Figure 9:
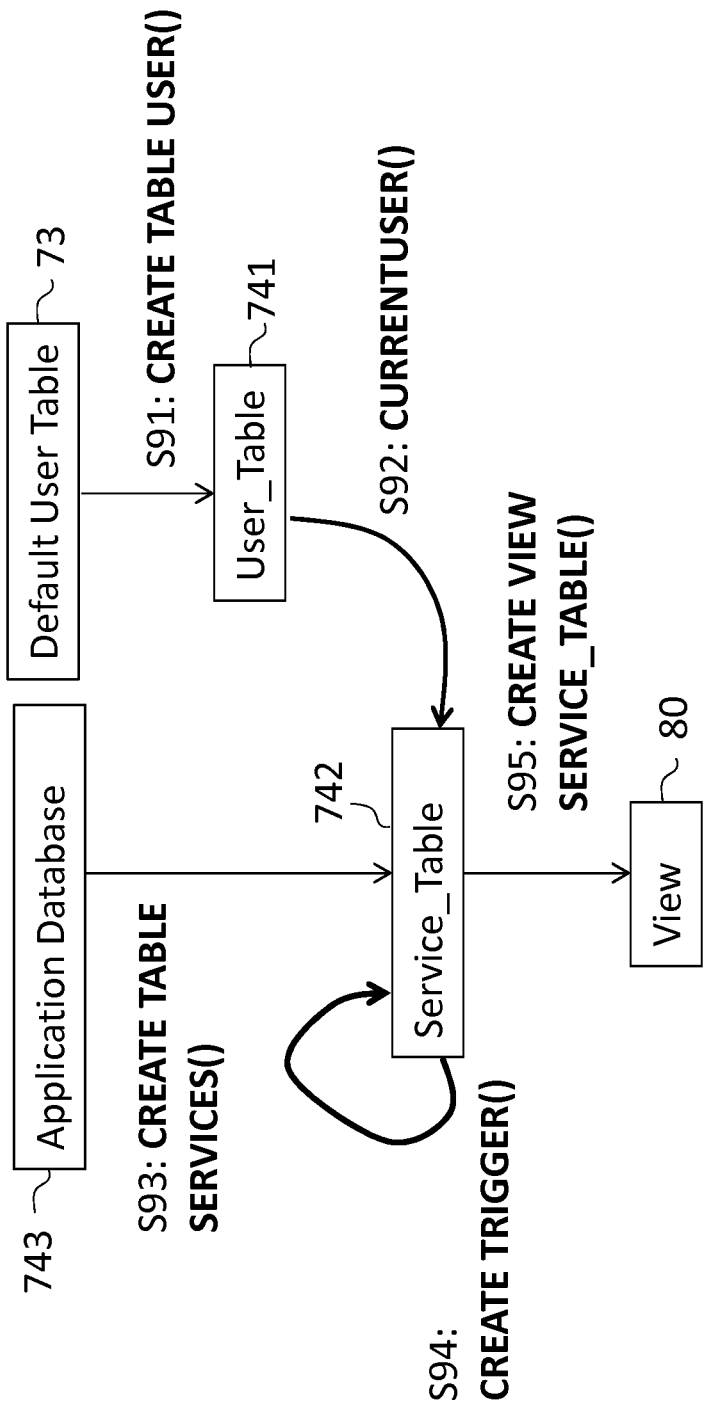
FIG. 9 is a schematic diagram illustrating relationship between functional elements in the management process module and exemplary function call/script according to an exemplary embodiment.

FIG. 9 is a schematic diagram illustrating relationship between the functional elements in the management process module and exemplary function call/script according to an exemplary embodiment. The following steps S91 to S95 are explained in accordance with exemplary scripts.

In the operation of the default database such as the database 72, there are fixed number of columns in the default user table 73, and the default user table 73 should not be modified by any operating user other than the root user. Usually, the root user is the administrator of the database 72. The default user table 73 can only be accessed by the root user of the database 72. Users other than the root user can only access data of the main database 74 through accessing the view 80 of all tables of the main database 74 in the virtualized cloud computing infrastructure 30. The default user table 73 is configured to keep the information of the different operating users of the computing cloud infrastructure 30.

In order to allow current users other than the root user to access the data in the main database 74 indirectly, the user_table 741 is firstly generated based on the default user table 73 and the group table 744 of the database 72. The current users other the root user are still blocked from directly accessing to the default database and modifying the default database. The users other than the root user can be only allowed to access data of the main database 74 through accessing the view 80 of tables of main database 74. The schema for the user_table 741 is similar to that shown in Table I. The function call of "CREATE TABLE USER" will create a table named as "user" based on the default user table 73. The creation of the user_table 741 will use following text fields shown in Table I. In this example, the "user_id" is the primary key, other fields of "user_name", "login_name", "user_password" are for user authentication. The "login_name" will be unique key in the user_table 741.

In step S91, the processor 41 of the administration node 4 will execute the function "CREATE TABLE USER" to create the user_table 741 from default user table 73 and group table 744 of the database 72. The function "CREATE TABLE USER" requires "user_id" and "group_id" as primary key and also other parameters such as "user_name", "login_name", "user_password". Here, the "login_name" will be the unique key. It should be noted that the main database 74 creation and user creation script is separately executed. An exemplary Schema for the user_table 741 in the main database 74 is shown in Table I below.

TABLE I

Exemplary Schema for "user_table" in "main database"

```
CREATE TABLE USER (
    user_id int(5) NOT NULL,
    user_name varchar(50) CHARACTER SET armscii8 NOT NULL,
    login_name varchar(30) NOT NULL,
    user_password varchar(50) NOT NULL,
    PRIMARY KEY (user_id)
    UNIQUE KEY login_name (login_name),
);
```

The user_table 741 is configured to store all relevant user parameters local to the application database 743 in the virtualized cloud computing infrastructure 30. The default user table 73 of the database 72 (i.e., the default database) is configured to store the "user_name" and "user_password" of the current user in the database 72. The user_table 741 is created from the default user table 73 by using the "CREATE TABLE USER". The user_table 741 is a separate user table maintained at a database level to keep the other information in the same database and also access the same database at graphical user interface (GUI). For example, a function shown in Table I is used to provide a user identifier and group identifier (i.e., "user_id") of the current user of the main database 74. The fields in this user_table 741 are: user_id (primary key), user_name, login_name and user_password. Here, login_name is a unique key with reference to the user_id in the user_table 741.

In the computing cloud infrastructure 30, each user is configured as a part of a specific group. The group table 744 is another table in the main database 74 of the present disclosure. An exemplary schema for the group table 744 in the main database 74 is shown in Table I below.

TABLE II

Exemplary Schema for "group table" in "main database"

```
CREATE TABLE group (
    group_id smallint(5) NOT NULL,
    group_name varchar(30) NOT NULL,
    PRIMARY KEY (group_id)
)ENGINE=InnoDB;
```

The group table 744 is configured to store all relevant user group parameters which are local to the application database in the virtualized cloud computing infrastructure 30. The default user table 73 of the main database 74 keeps the "group_name" and "group_id" of the current user in the main database 74. The group table 744 is a separate user table maintained at database level to keep the other information in the same database and also access the same database at graphical user interface (GUI). For example, a function as shown below can be used to provide user group identifier (i.e., group_id) of the current user of the main database 74. The fields in this "group" table are: group_id (primary key), and group_name.

Then, in step S92, the processor 41 of the administration node 4 executes the function "CURRENTUSER" to retrieve parameters of users from the user_table 741. The parameters will be used for the creation of the service table and "service_table view". An exemplary script for the function call of "CURRENTUSER" is shown in Table III below.

TABLE III

Exemplary Script of "CURRENTUSER"

```
DROP FUNCTION IF EXISTS CURRENTUSER;
DELIMITER $$
CREATE FUNCTION CURRENTUSER( )
    RETURNS INT READS SQL DATA
BEGIN
    DECLARE userId INT;
        select user_id INTO userId FROM user where (user_name =
        substring_index(user( ),'@',1));
        RETURN userId;
END;
$$
DELIMITER ;
```

The "user_id" is stored in the default user table 73, but the default user table 73 is not visible to users other than the root user. The "user_id" of the current user of the main database 74 is fetched form the user_table 741. In the present invention, the "CURRENTUSER" script is executed by the processor 41 on the main database 74 to provide the "user_id" of the current user of database 72, where the current user of the main database 74 is the same as the database 72. The "CURRENTUSER" function can also be used by views of all tables of the main database 74 so as to show the information of the current user.

In step S93, the processor 41 of the administration node 4 executes the function "CREATE TABLE SERVICES" to create service tables from all tables of the application database 743 (i.e., the main database). In the virtualized cloud computing infrastructure 30, a service_table 742 is a general information table generated in the main database 74 based on the application database 743. The service_table 742, also includes multiple tables and each table in the service_table 742 can have an additional column to keep the owner's "user_id" (or "owner_user_id") of that row. In this example, the "owner_user_id" will be the same as the "user_id" of the owner. An exemplary Schema for the service_table 742 in the main database 74 is shown in Table IV below.

TABLE IV

Exemplary Function of "CREATE TABLE SERVICES"

```
CREATE TABLE SERVICES (
    service_id mediumint(7) NOT NULL,
    service_name varchar(30) NOT NULL,
    service_description varchar(50) NOT NULL,
    owner_user_id smallint(5) DEFAULT NULL,
    PRIMARY KEY (service_id),
    KEY owner_group_id (owner_user_id),
    CONSTRAINT services_ibfk_1 FOREIGN KEY
    (owner_group_id) REFERENCES user
    (user_id)
);
```

The "CREATE TABLE SERVICES" query shown in Table IV is configured to create the service tables or the service_table 742, which is configured to store certain information about the services for different users. The fields in this table are: service_id (primary key), service_name, service_description and owner_user_id. Here, the "owner_user_id" is a foreign key with reference to the "user_id" in the user_table 741.

In the present invention, all services data of all users stored in the main database 74 is stored in one service_table 742, but the service_tables 742, will not be exposed directly to any current user other than the root user. In the present invention, a view of the service table will be created for the users other than the root user such that each user can only get the services data belonging to the operating user. For example, a user "voda" can only view the service data through the view 80 of the "service table" but cannot view the service data belonging to another user "cellos".

In step S94, the processor 41 of the administration node 4 executes the function "CREATE TRIGGER" to insert the user information (i.e., "user id") in the user column and group information (i.e "group_id") in the group column of all the service tables, while inserting a row in each table. It should be noted that these "user id" and "group_id" of the current user is acquired by using the function "CURRENTUSER" fetched from the user_table 741.

In order to achieve isolation of service data in the service tables, an exemplary "CREATE TRIGGER" script is shown below in Table IV. The function call "CREATE TRIGGER" can be used to insert an "owner_user_id" in a column in the service_table 742, while doing the insert operation from a view 80. The view 80 can be used by the operating user to access the information stored in service tables.

TABLE V

Exemplary Function of "CREATE TRIGGER"

CREATE TRIGGER before_insert_services
    BEFORE INSERT ON services
    FOR EACH ROW
    SET new.owner_user_id= CURRENTUSER;

After modification of the service tables by inserting the "user_id" of the operating user in the column storing the "owner_user_id", the wrapper view 80 can be created for accessing the service data stored in the service tables for the operating user. An exemplary "CREATE VIEW SERVICE TABLE" query is shown below in Table IV for creating the wrapper view.

TABLE VI

Exemplary Query of "CREATE VIEW SERVICE_TABLE"

CREATE VIEW SERVICE_TABLE(
    service_id,
    service_name,
    service_description
    )
AS
select
    services.service_id AS service_id,
    services.service_name AS service_name,
    services.service_description AS service_description
from services
where
    (services.owner_user_id = (select user.user_id from user where (user.user_name = substring_index(user( ),'@',1))) OR substring_index(user( ), '@', 1) = 'root');

In step S95, the processor 41 of the administration node 4 will execute the function "CREATE VIEW SERVICE_TABLE" to create view 80 for the service_table 742. When there are multiple service tables created in the step S93, the views of all service table will be created by executing the function "CREATE VIEW SERVICE_TABLE". It should be noted that execution of the function "CREATE VIEW SERVICE_TABLE" includes a condition provided in the "where clause" so as to fetch rows of the operating user. As such, the operating user will be identified at runtime using the function "CURRENTUSER" mentioned above. The view for all service tables are essential building block in the present invention, since the view is the only visible database entity to the operating users other than root user.

The query of "CREATE VIEW SERVICE_TABLE" can create the view 80 for the service_table 742. Here, a view contains rows and columns of the service tables, just like a real table. However, a view does not store the data as it is in the case of a table. A view is rather a presentation wrapper/wrapper view created over a service tables to depict the data in the desired form. Each field of view will be mapped to a field in the service table, and the selection criteria is provided in the "where" clause shown in Table IV. Therefore, it only provides the service data of the current user. In particular, the query of "CREATE VIEW SERVICE_TABLE" can create a wrapper view to access the service information stored in service_table 742, and only allow the operating user to access to the service information which has "owner_user_id" in the "service table" corresponding to the operating user's "user_id". Here, when it is determined that "owner_user_id" is the same as "user_id" of a currently login user, the currently login user can see all service data of service tables due to the service view(s) created by the query of "CREATE VIEW SERVICE_TABLE".

When a new user is added to the database, the root user of the main database 74 may use the "insert" statement similar to "CREATE VIEW Service view" shown in Table V below for inserting the new user in the user_table 741. Exemplary script for inserting new user into the main database 74 is shown below in Table V.

TABLE VII

Exemplary Statement for inserting user information

INSERT INTO user (user_id, user_name, login_name, user_password)
VALUES
(1,'user1','user1','user1password');
INSERT INTO user (user_id, user_name, login_name, user_password)
VALUES
(2,'user2','user2','user2password');

The statement shown in Table VI below simply grants "select", "insert", "update" and "delete" operation privileges to the specified user.

TABLE VIII

Exemplary Statement for Granting Privileges to Created Users other than Root User GRANT EXECUTE ON FUNCTION CURRENTGROUP TO
    user1@localhost IDENTIFIED BY "user1password";
GRANT SELECT, INSERT, UPDATE, DELETE ON TABLE
service_table TO
    user1@localhost IDENTIFIED BY "user1password";
GRANT EXECUTE ON FUNCTION CURRENTGROUP TO
    user1@localhost IDENTIFIED BY "user1password";
GRANT SELECT, INSERT, UPDATE, DELETE ON TABLE
service_table TO
    user1@localhost IDENTIFIED BY "user1password";

For example, the exemplary statements can grant privileges to two different database users, such as user1 and user2, with their respective passwords. When the user logs in to the database using "user1" and enters certain information (such as "user1password") in "service_table" view and select the information from service_table 742, the information inserted by user1 will not be viewed by the user2 when the user2 logs in to the same database. Similarly, the user1 will not be allowed to view the information selected, inserted, updated or deleted by the user2.

After, the step S95, other optional steps may be performed. For example, a user will be allowed perform select, insert, update or delete operation(s) on these views, but not on the tables of the main database, where the actual data resides. Therefore, a view can act as a wrapper for the service_table 742, so that the data can only be accessed using views. Furthermore, permission is granted to operating user group/the desired users by using the functional call as shown in Table VI to the view 80 only. Therefore, the user can only access the view for all the desired tables. User access to the application database 743 is still blocked. By doing so, any user will not be able to access the actual table by any mean. The aforementioned steps S91-S95 are automated via scripts and executed while creating a database, but the "inserting user information" script may be repeated using another automated script whenever a new user is created.

It should be noted that trigger, function, and tables of the main database 74 is created once at the time of database creation. Later on, while a user performs an insert operation on a view 80, the inserted data will be automatically inserted in the respective service tables. Meanwhile, when the inserted data is inserted in the service_table 742, the function "CREATE TRIGGER" will insert the "user_id" and "group_id" of the operating user in an "owner_user_id" and "owner_group_id" field of the inserted row in the updated service_table 742. The "user_id" will be previously returned by the "CURRENTUSER" script.

Figure 10:
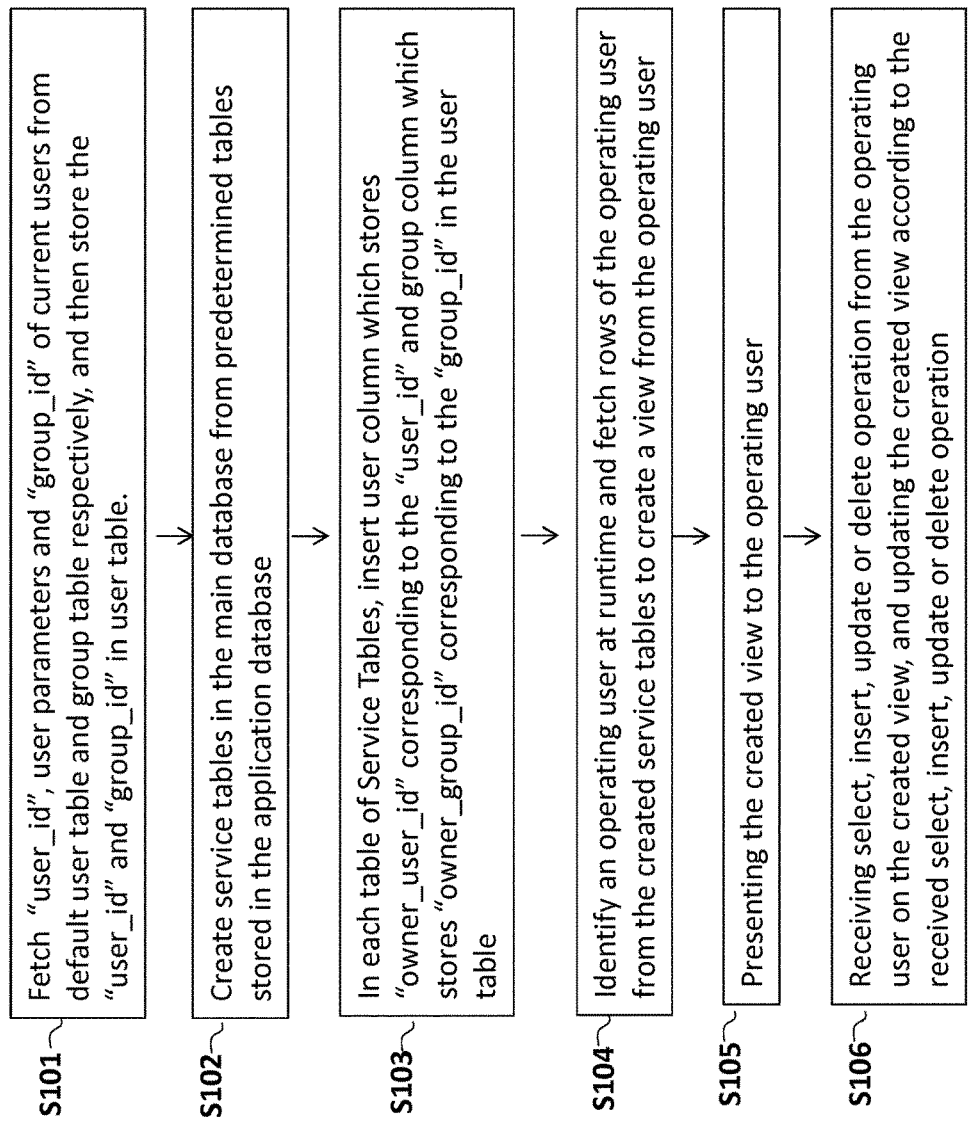
FIG. 10 is a schematic flowchart illustrating method of isolating database in the database system according to an exemplary embodiment.

FIG. 10 is schematic flowchart illustrating method of isolating database in the computing cloud infrastructure according to an exemplary embodiment. The method of "isolating database" in a database application of the virtualized cloud computing infrastructure 30 includes following steps S101-S106.

In step S101, the management process module 431 is configured to fetch "user_id" and user parameters of each current user from the default user table 73 and to fetch "group_id" of each current user from the Group table 744 and then store the "user_id" and "group_id" of each current user in the user_table 741 of the main database 74.

In step S102, the management process module 431 is configured to create service tables in the main database 74 from the predetermined tables stored in the application database 743 respectively. It should be noted that all the service tables may be stored in the memory allocation of the service_table 742.

In step S103, the management process module 431 is configured to acquire the "user_id" and the "group_id" stored in the user_table 741 for each current user, and then insert a user column and a group column in each table of the service tables, where the user column is configured to store "owner_user_id" corresponding to the "user_id" and the group column is configured to store "owner_group_id" corresponding to "group_id" stored in the user_table 741.

In step S104, the management process module is configured to identify an operating user at runtime, fetch rows of the operating user from the created service tables by the operating user's "user_id" and "group_id", and then create a view 80 of each table in the service tables for the current user by the current user's "user_id" and "group_id". The management process module will identify the current user at runtime by using the function "CURRENTUSER" function and then use "CREATE VIEW SERVICE_TABLE" function to fetch rows of a current user. For example, after a user logs in to the database system of the virtualized cloud computing infrastructure 30, the OAMP entity 71 may use the authentication parameters of "user_name", "login_name", "user_password" input by the user to determine the primary key of "user_id" and "group_id" in the user_table 741. Such determination of "user_id" and "group_id" uses the aforementioned function "CURRENTUSER". Then, by fetching rows of the current user in the service table through using the primary key "user_id" and "group_id", the view 80 corresponding to the current user will be created and presented to the operating user.

In step S105, the management process module 431 is configured to present the created view (i.e., the view 80) in the main database (i.e., the application database 743) to the operating user.

In step S106, the management process module 431 is configured to receive a select, a insert, a update or a delete operation from the current user on the created view, and then update the created view according to the received select, insert, update or delete operation. Thus, the operating user will be able to perform all select, insert, update and delete operations on these views, but not on the main tables of the main database (i.e., tables in the application database), where the actual data resides. When a current user performs an insert operation on a view, the inserted data will be automatically inserted in the respective service table, and the "user_id" and the "group_id" of the current user will be inserted automatically in an "owner_user_id" and an "owner_group_id" field of the inserted row in the updated service table.

Before the step S106, optionally, the management process module 431 will be configured to granting each operating user with authorization to perform select, insert, update or delete operation on the created view respectively corresponding to the user.

Both the database level isolation and the application level isolation can be achieved by the aforementioned method of "database isolation". When the user logs in using a username/password, the username will be mapped to the owner column (or the column containing "owner_user_id" and "owner_user_id") and the corresponding service data in the main database will be shown to the operating user by presenting the view. The application level database isolation internally uses the database isolation mechanism only.

According to an alternate embodiment of the invention, the "isolation database" concept is implemented in a computer apparatus.

Accordingly, there is provided a system to isolate a database in a database system stored in computer system. The system comprises of a computing apparatus, configured to perform the following upon receipt of input commands from an operating user, fetching, a user identifier and a set of user parameters of each current user in the database system from a default user table. Then, the system is configured to fetch a group identifier of each current user from a group table in a main database. Next, a user table is created for storing all the fetched user identifiers, all the fetched group identifiers and the user parameters of the current users. Further, the computing apparatus, fetches, the user identifier and the group identifier from the user table corresponding to a user name input by the operating user upon login in to the system. Then, a plurality of service tables are created respectively from a plurality of predetermined tables stored in an application database in the main database. Thereafter, a user column which stores owner user identifiers corresponding to each of the stored user identifiers and a group column which stores owner group identifier corresponding to each of the stored group identifiers are inserting, into each of the created service tables. Further, the operating user is determined at run time and fetching at least one row corresponding to the operating user from each of the created service tables according to the owner user identifier and the owner group identifier of the operating user. A view for each of the created service tables is created based on the fetched at least one row of the operating user and one of the input commands. Finally, the created views containing service data originally stored in the tables of the application database are displayed to the operating user.

Accordingly, there is also provided a method to isolate a database in a database system stored in a computer system. The method comprises of: fetching, a user identifier and a set of user parameters of each current user in the database system from a default user table; fetching a group identifier of each current user from a group table in a main database; creating, a user table for storing all the fetched user identifiers, all the fetched group identifiers and the set of user parameters of the current users; receiving, a user name and a user password from an operating user, when the operating user logs into the system; fetching one of the stored user identifiers and one of the stored group identifiers corresponding to the user name input by the operating user; creating, a plurality of service tables respectively from a plurality of predetermined tables stored in an application database in the main database; inserting, into each of the created service tables, a user column which stores owner user identifiers corresponding to each of the stored user identifiers and a group column which stores owner group identifier corresponding to each of the stored group identifiers; determining, the operating user at run time and fetching at least one row corresponding to the operating user from each of the created service tables according to the owner user identifier and the owner group identifier of the operating user; creating, a view for each of the created service tables based on the fetched at least one row of the operating user and one of input commands from the operating user; finally, presenting, to the operating user, the created views containing service data originally stored in the tables of the application database.

Accordingly, there is provided a computing apparatus to isolate a database system stored in a computer system. The computing apparatus comprises of: a management process module configured to perform the following: a computing apparatus, configured to perform the following upon receipt of input commands from an operating user: fetching, a user identifier and a set of user parameters of each current user in the database system from a default user table. Then, the system is configured to fetch a group identifier of each current user from a group table in a main database. Next, a user table is created for storing all the fetched user identifiers, all the fetched group identifiers and the user parameters of the current users. Further, the computing apparatus, fetches, the user identifier and the group identifier from the user table corresponding to a user name input by the operating user upon login in to the system. Then, a plurality of service tables are created respectively from a plurality of predetermined tables stored in an application database in the main database. Thereafter, a user column which stores owner user identifiers corresponding to each of the stored user identifiers and a group column which stores owner group identifier corresponding to each of the stored group identifiers are inserting, into each of the created service tables. Further, the operating user is determined at run time and fetching at least one row corresponding to the operating user from each of the created service tables according to the owner user identifier and the owner group identifier of the operating user. A view for each of the created service tables is created based on the fetched at least one row of the operating user and one of the input commands. Finally, the created views containing service data originally stored in the tables of the application database are presented to the operating user.

Figure 11:
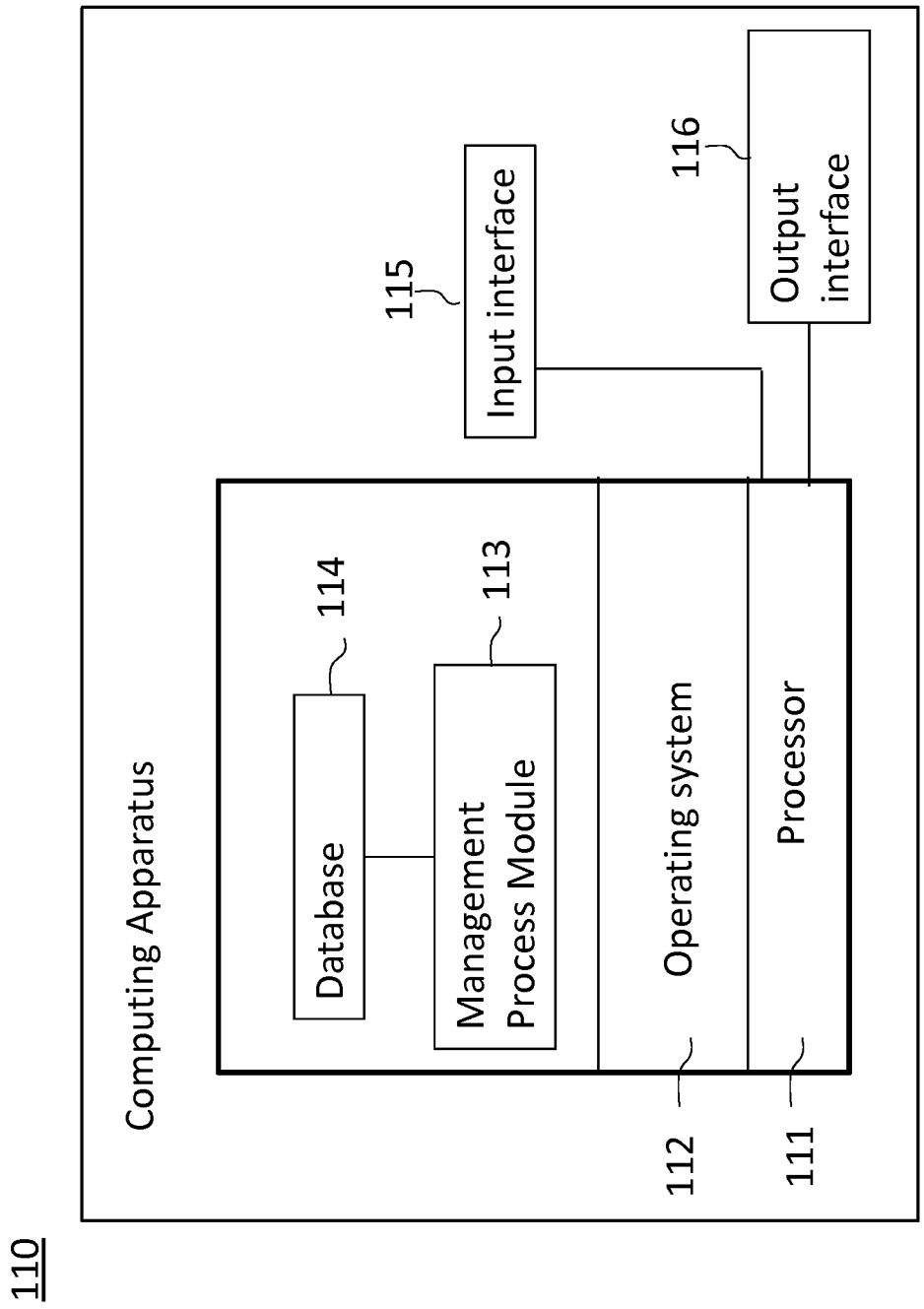
FIG. 11 is a schematic diagram illustrating functional elements of a computing apparatus to isolate database according to an exemplary embodiment.

FIG. 11 is a schematic diagram illustrating functional elements of a computing apparatus to isolate database according to an exemplary embodiment. Referring to FIG. 11, a computing apparatus 110 is adapted to isolate a database of multi-user/multi-tenant from other user/tenant in a database system. The computing apparatus 110 may include a processor 111, an operating system 112 running on top of the processor 110, a management process module 113, a database 114, an input interface 115 and an output interface 116. The database 114 and the management process module 113 may be running on top of the operating system 112. The input interface 115 and the output interface 116 may be connected to the management process module 113 via the processor 111 and the operating system 112. In this embodiment, the management process module 113 may be configured to receive one or more input commands from an operating user via the input interface 115, where the input interface 115 may be a touch panel, a keyboard, a voice recognition system, and so forth. The management process module 113 in the standalone computing apparatus 110 is connected to the database 114 which stores data/service data of multiple current users. The operating user may be given access to the data/service data that the operating user is authorized through the computing apparatus 110.

Upon receipt user credentials such as username and passwords and/or other user-related parameters via the input interface 115, the computing apparatus 110 may perform the steps S101-S106 previously described in accordance with FIG. 10, except that the data/service data is not provided by any application node and the standalone computing apparatus 110 is not part of any cloud computing infrastructure or platform. Therefore, the operating user can be presented with the created view via the output interface 116 such as a display device.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a computing device shown in FIG. 11, a computing cloud infrastructure shown in FIG. 3. A computer-readable medium may include a computer-readable storage medium (e.g., a physical device) that may be any media or means that can carry or store the instructions for use by or in connection with a system, apparatus, or device, such as a computer or a communication device. For instance, the memory unit may include the computer-readable medium which may include computer program code, when executed by the processor unit, may cause the management process module and the CLP entity in the administration node, the CLP entity and NMP entity in the application node to perform procedures/steps illustrated in FIGS. 7-10.

By executing the methods of isolating database in computing cloud infrastructure shown in preceding exemplary embodiments or in a computer system, it will be more efficient and more secured in implementing "database isolation" in a multi-tenant or multi-user database system storing service data belonging to different users. All insertion and updating of configuration data or service data on the view will be updated to the corresponding table, while the original table in the default database and the application database will be protected from unauthorized access.

Embodiments of the method of the present invention provide useful solutions to efficiently and effectively isolating database in a computing cloud infrastructure and also enable secured user access to services data in the computing cloud infrastructure.

The aforementioned embodiments have been described by way of example only and modifications are possible within the scope of the claims that follow.

What is claimed is:

1. A system adapted to isolate a database in a database system, comprising:
 a computing apparatus, configured to perform the following upon receipt of input commands from an operating user:
 fetching, a user identifier and a set of user parameters of each current user in the database system from a default user table;
 fetching a group identifier of each current user from a group table in a main database;
 creating, a user table for storing all the fetched user identifiers, all the fetched group identifiers and the user parameters of the current users;
 fetching, the user identifier and the group identifier from the user table corresponding to a user name input by the operating user upon login in to the system;
 creating, a plurality of service tables respectively from a plurality of predetermined tables stored in an application database in the main database;
 inserting, into each of the created service tables, a user column which stores owner user identifiers corresponding to each of the stored user identifiers and a group column which stores owner group identifier corresponding to each of the stored group identifiers;
 determining, the operating user at run time and fetching at least one row corresponding to the operating user from each of the created service tables according to the owner user identifier and the owner group identifier of the operating user;
 creating, a view for each of the created service tables based on the fetched at least one row of the operating user and one of the input commands; and
 presenting to the operating user, the created views containing service data originally stored in the tables of the application database.

2. The system as claimed in claim 1, wherein the default user table and the main database are stored in the database system.

3. The system as claimed in claim 1, wherein the computing apparatus is connected to at least one application node in a cloud computing infrastructure, and the at least one application node report service data to the computing apparatus.

4. The system as claimed in claim 3, wherein the application database comprises the predetermined tables containing service data reported by processes running on the at least one application node in the cloud computing infrastructure.

5. The system as claimed in claim 3, wherein the computing apparatus is further configured to store, update and maintain the configuration information of all the processes and services running on the at least one application node in the cloud computing infrastructure.

6. The system as claimed in claim 1, wherein said one of the input commands from the operating user is a select query command.

7. The system as claimed in claim 1, wherein the set of user parameters comprise at least user name, user login name and user password of the current users in the database system.

8. The system as claimed in claim 3, wherein the computing apparatus is further configured to maintain, in the default user table, information of all the current users in the database system.

9. The system as claimed in claim 3, wherein the computing apparatus is further configured to update the created service tables according to new service data reported by the at least one application node.

10. A method adapted to isolate a database in a database system, comprising:
 fetching, a user identifier and a set of user parameters of each current user in the database system from a default user table;
 fetching a group identifier of each current user from a group table in a main database;
 creating, a user table for storing all the fetched user identifiers, all the fetched group identifiers and the set of user parameters of the current users;
 receiving, a user name and a user password from an operating user, when the operating user logs into the system; fetching one of the stored user identifiers and one of the stored group identifiers corresponding to the user name input by the operating user;
 creating, a plurality of service tables respectively from a plurality of predetermined tables stored in an application database in the main database;
 inserting, into each of the created service tables, a user column which stores owner user identifiers corresponding to each of the stored user identifiers and a group column which stores owner group identifier corresponding to each of the stored group identifiers;
 determining, the operating user at run time and fetching at least one row corresponding to the operating user from each of the created service tables according to the owner user identifier and the owner group identifier of the operating user;
 creating, a view for each of the created service tables based on the fetched at least one row of the operating user and one of input commands from the operating user; and
 presenting, to the operating user, the created views containing service data originally stored in the tables of the application database.

11. The method as claimed in claim 10, wherein the default user table and the main database are stored in the database system.

12. The method as claimed in claim 11, wherein the database system is stored in a computing apparatus.

13. The method as claimed in claim 12, further comprising:
 receiving the service data reported by at least one application node connected with the computing apparatus.

14. The method as claimed in claim 11, wherein said one of the input commands from the operating user is a select query command.

15. The method as claimed in claim 12, further comprising:
   updating the created service tables according to new service data reported by the at least one application node.

16. A computing apparatus adapted to isolate a database system, comprising:
   a management process module configured to perform the following:
      fetching, a user identifier and a set of user parameters of each current user in the database system from a default user table; fetching a group identifier of each current user from a group table in a main database; creating, a user table for storing all the fetched user identifiers, all the fetched group identifiers and the related user parameters of the current users;
      fetching one of the stored user identifiers and one of the stored group identifiers corresponding to a user name input by an operating user;
      creating, a plurality of service tables respectively from a plurality of predetermined tables stored in an application database in the main database; inserting, into each of the created service tables, a user column which stores owner user identifiers corresponding to each of the stored user identifiers and a group column which stores owner group identifier corresponding to each of the stored group identifiers;
      determining, the operating user at run time and fetching at least one row corresponding to the operating user from each of the created service tables according to the owner user identifier and the owner group identifier of the operating user;
      creating, a view for each of the created service tables based on the fetched at least one row of the operating user and one of the input commands; and
      presenting to the operating user, the created views containing service data originally stored in the predetermined tables of the application database.

17. The computing apparatus as claimed in claim 16, further comprising:
   a network interface, connected with at least one application node, and configured for receiving service data from the at least one application node.

18. The computing apparatus as claimed in claim 16, wherein the default user table and the main database are stored in the database system, and the database system is stored in the computing apparatus.

19. The computing apparatus as claimed in claim 16, wherein the management process module is configured to display the created view in the main database to the operating user via an external displaying device.

* * * * *